United States Patent Office 3,420,744
Patented Jan. 7, 1969

3,420,744
PROCESS FOR PRODUCING L-GLUTAMINE
Yuichi Noguchi, Junichi Nakajima, Tetsuo Uno, and Toru Nakanishi, Hofu-shi, Japan, assignors to Kyowa Hakko Kogyo Co., Ltd., Tokyo, Japan, a corporation of Japan
No Drawing. Filed Mar. 1, 1966, Ser. No. 530,801
Claims priority, application Japan, Mar. 1, 1965, 40/11,369
U.S. Cl. 195—29     9 Claims
Int. Cl. C12d 13/06

This invention relates to a process for producing L-glutamine. More particularly, it relates to a process for the production of L-glutamine by fermentation. Even more particularly, the invention relates to a process for the production of L-glutamine by fermentation with micro-organisms in the presence of certain metals.

It is well known, as described in U.S. Patent No. 3,216,906, that L-glutamine can be produced by fermentation and that large quantities thereof are accumulated in the culture liquor if the fermentation is carried out with microorganisms having glutamic acid-producing ability in a culture medium which contains carbohydrates as the base to which nitrogen sources such as ammonium salts and the like are added in amounts exceeding that necessary for the growth of the cell bodies and for the production of L-glutamic acid. Accordingly, in this process the L-glutamic acid fermentation is converted into L-glutamine fermentation by the addition of more than 10 parts by weight of nitrogen per 100 parts of carbon in the culture medium.

The prior art fermentation process described above requires keeping a high nitrogen level (concentration of ammonium salt) in the culture liquor. Therefore, the growth of the microorganisms is considerably inhibited. Moreover, as shown in the following L-glutamic acid reaction scheme, a molar equivalent of adenosine triphosphate (ATP) is necessary in order to produce L-glutamine from L-glutamic acid. Hence, more energy is required in this fermentation system.

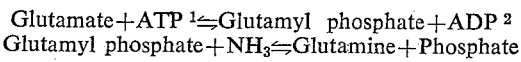
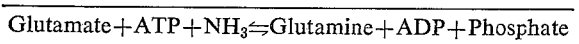

[1] Adenosine triphosphate.
[2] Adenosine diphosphate.

Thus, it can be seen that investigation of the factors of growth and production in an L-glutamine fermentation are more complicated than those in an L-glutamic acid fermentation. Resolution of this problem is important in order to obtain an increased yield of L-glutmaine in the production thereof by fermentation.

In the above-mentioned U.S. Patent No. 3,216,906, only carbohydrates such as glucose and the like, nitrogen sources such as inorganic and organic ammonium salts, ammonia, urea, etc., nutrients such as biotin, thiamine, etc., in trace amounts, and inorganic sources such as phosphoric acid salts, magnesium salts, iron salts and manganese salts are employed. Also, the present inventors know of no other reports which relate to factors accelerating the production of L-glutamine by fermentation, except that mentioned above relating to increasing the amount of nitrogen in the culture medium.

As the result of investigating the various factors which influence the fermentation production of L-glutamine with reference to the characteristics of the L-glutamine fermentation as described above, the present inventors previously found that the amount of L-glutamine in the culture liquor accumulated is significantly increased by conducting the culture in the presence of zinc or molybdenum or both together with the conventional salts of metals such as magnesium, iron, manganese, etc., in the culture medium. It was found that the addition of zinc was especially effective. (Japanese patent application No. 72,014/1964.)

However, since L-glutamine is an important substance biochemically and has utility in certain applications, the present inventors have continued their extensive investigations and by means of the present invention have discovered a method of remarkably increasing the yields of L-glutamine which may be obtained by fermentation in the presence of microorganisms.

One of the objects of the present invention is to provide an improved process for the production of L-glutamine which overcomes the disadvantages and deficiencies of the prior art methods.

Another object of the present invention is to provide a process for producing L-glutamine by fermentation which may be carried out in an efficacious and simple manner.

A further object of the invention is to provide a process for producing L-glutamine by fermentation which gives the product in high purity and good yield.

A still further object of the invention is to provide a process for producing L-glutamine by fermentation which may be carried out advantageously on an industrial scale at low cost to give a high yield of product.

These and other objects and advantages of the present invention will become apparent to those skilled in the art from a consideration of the following specification and claims.

In accordance with the present invention, it has been found that the production of L-glutamine is remarkably increased while the necessary time of fermentation is reduced by conducting the culture in a culture medium containing lead, chromium, nickel, aluminum, cobalt, mercury or mixtures thereof in an amount of more than $10^{-7}$ M per 1 liter of the culture medium. The basal culture medium employed is that conventionally employed therefor and contains carbohydrates, nitrogen sources, inorganic salts and trace nutrients such as biotin and the like.

The cause of the effect of these metals on the fermentation is not clearly understood, however, it has been noted that the use of a concentration as high as possible of ammonium salts in the culture medium of the present invention is advantageous in producing high yields of L-glutamine. From this fact, it is believed that the advantageous results obtained by the use of the metals mentioned above in accordance with the present invention stems from their role in bringing salt resistance to the cell bodies of the microorganisms. Thus, the production activity thereof remains significant in the presence of ammonium salts in high concentrations whereby the yield of L-glutamine by fermentation is remarkably increased.

In order to show the effects of the present invention, an experimental example showing the relation between the concentration of metals employed and the amount of L-glutamine produced for different concentrations of ammonium chloride in the culture medium is shown in Table 1. The strain employed in this experiment was *Micrococcus glutamicus* ATCC No. 14752. The composition of the basal culture medium was as follows:

| | |
|---|---|
| Glucose | percent__ 12.0 |
| $KH_2PO_4$ | do____ 0.05 |
| $K_2HPO_4$ | do____ 0.05 |
| $MgSO_4 \cdot 7H_2O$ | do____ 0.05 |
| $MnSO_4 \cdot 4H_2O$ | do____ 0.002 |
| $FeSO_4 \cdot 7H_2O$ | do____ 0.002 |
| $ZnSO_4 \cdot 7H_2O$ | do____ 0.001 |
| Urea | do____ 0.5 |
| $CaCO_3$ | do____ 2.0 |
| Biotin | γ/l__ 5.0 |
| Thiamine | mg./l__ 1 |
| $NH_4Cl$ [1] | |

[1] 4.0%, 5.0%, 6.0%, respectively, as shown in Table 1.

The quantities shown above are per liter of water.

Culturing was carried out in flasks which were aerobically shaken. The metals shown in Table 1 which were added to the culture medium were added in the form of the following salts:

Pb: $Pb(CH_3COO)_2 \cdot H_2O$
Cr: $K_2CrO_4$
Ni: $NiCl_2 \cdot 6H_2O$
Al: $K_2Al_2(SO_4)_4 \cdot 24H_2O$
Co: $CoCl_2 \cdot 6H_2O$
Hg: $Hg(CH_3COO)_2 \cdot H_2O$

TABLE 1

| Ammonium chloride | Metal, concentration (per liter) | Amount of L-glutamine produced (mg./ml.) | | | | | |
|---|---|---|---|---|---|---|---|
| | | 0 | $10^{-7}M$ | $10^{-6}M$ | $10^{-5}M$ | $10^{-4}M$ | $10^{-3}M$ |
| 4% | Basal medium | 29.6 | | | | | |
| | Pb | | 29.4 | 32.9 | 34.7 | 29.1 | 23.2 |
| | Cr | | 29.2 | 33.5 | 35.2 | 36.2 | 26.2 |
| | Ni | | 30.8 | 34.7 | 35.7 | 38.7 | 9.6 |
| | Al | | 30.4 | 33.9 | 34.0 | 33.6 | 32.8 |
| | Co | | 34.6 | 33.6 | 32.9 | 7.6 | |
| | Hg | | 29.6 | 33.2 | 34.2 | 20.7 | |
| 5% | Basal medium | 31.0 | | | | | |
| | Pb | | 31.9 | 33.5 | 35.2 | 28.1 | 20.2 |
| | Cr | | 32.5 | 34.2 | 36.2 | 39.6 | 30.1 |
| | Ni | | 33.6 | 35.2 | 37.0 | 40.2 | 4.3 |
| | Al | | 33.2 | 34.1 | 35.8 | 35.6 | 34.4 |
| | Co | | 36.2 | 32.3 | 31.6 | 3.8 | |
| | Hg | | 31.8 | 34.3 | 33.8 | 15.8 | |
| 6% | Basal medium | 27.2 | | | | | |
| | Pb | | 27.3 | 29.5 | 28.2 | 27.1 | 16.2 |
| | Cr | | 27.5 | 33.8 | 36.2 | 37.4 | 27.6 |
| | Ni | | 27.4 | 34.2 | 37.8 | 39.8 | 3.2 |
| | Al | | 26.9 | 33.2 | 34.8 | 35.2 | 35.6 |
| | Co | | 31.8 | 30.4 | 30.6 | 2.1 | |
| | Hg | | 27.1 | 30.2 | 30.1 | 15.2 | |

As is evident from Table 1, when an L-glutamic acid-producing microorganism such as *Micrococcus glutamicus* is employed, the amount of L-glutamine produced is increased by more than 10% compared with that obtained in the basal medium by adding thereto the above-mentioned metals in the required concentrations, i.e., more than $10^{-6}$ M per 1 liter of the culture medium of lead, chromium, nickel, aluminum and mercury and more than $10^{-7}$ M of cobalt, respectively, to the culture medium containing the essential nutrients for the fermentation production of L-glutamine. The addition of nickel and chromium to the culture medium is especially significant. With these two metals, an increase of more than 20% in the production amount of L-glutamine as compared with the basal medium alone is observed. The difference is even more significant as the concentration of ammonium chloride is increased. This factor implies that the presence of these metals endows the microorganisms with salt resistance.

As to mixtures of these metals, a synergistic effect is noted. For example, the relationship between the amounts of L-glutamine produced and the amount of chromium and nickel simultaneously added to the culture medium is shown in Table 2. A significant synergism is to be noted when both metals are added in fairly large amounts.

TABLE 2

| Ni* (per liter of the culture medium) | Cr* (per liter of the culture medium) | | | |
|---|---|---|---|---|
| | 0 | $10^{-5}$ M | $5 \times 10^{-5}$ M | $10^{-4}$ M |
| | Amount of L-glutamine produced (mg./ml.) | | | |
| 0 | 30.5 | 34.2 | 35.0 | 37.0 |
| $10^{-5}$ M | 35.4 | 36.7 | 39.9 | 40.2 |
| $5 \times 10^{-5}$ M | 37.7 | 38.8 | 42.3 | 43.5 |
| $10^{-4}$ M | 38.5 | 39.9 | 43.4 | 45.6 |

*Each metal is added in the form of the metal salt mentioned in connection with Table 1.

All of the microorganisms having the ability to produce L-glutamic acid may be employed in the present invention. These include the Micrococcus, Brevibacterium, Escherichia genera as well as others.

The culture medium to be employed in the present invention may be either a synthesized culture medium or an organic culture medium. Those conventionally used may be employed as long as they contain the essential nutrients for the growth of the microorganisms employed. Such nutrients are well known in the art and include substances such as a carbon source, a nitrogen source, inorganic compounds, trace nutrients and the like which are utilized by the strain employed in appropriate amounts. Thus, as a carbon source, there may be mentioned, by way of example, carbohydrates such as glucose, fructose, mannose, galactose, sucrose, maltose, lactose, starch hydrolysate, waste molasses and the like. Mixtures of two or more of these substances may be employed.

As a nitrogen source, various kinds of inorganic or organic salts or compounds such as ammonia, ammonium sulfate, ammonium chloride, ammonium nitrate, ammonium carbonate, ammonium acetate, etc., nitrates, urea, or other compounds containing nitrogen, such as peptone, meat extract, yeast extract, corn steep liquor, casein hydrolysate, fish meal, chrysalis and the like may be employed. Mixtures of these substances may, of course, be utilized. Inorganic salts which may be added to the culture medium include those of phosphoric acid, potassium, magnesium, iron, manganese and zinc. These substances may also be utilized in mixtures of two or more. Finally, it is necessary to add to the culture medium essential nutrients for the growth of the micro-organisms employed such as trace amounts of biotin, thiamine, etc.

As far as the metals of the present invention are concerned, the salts thereof or substances containing these metals may be employed. The optimum amount of each metal is generally about $10^{-5}$ M per 1 liter of the culture medium, although the amount differs somewhat depending on the particular metal and the particular culture medium used.

The culture media may be sterilized by boiling with steam either for all or a part of the sterilization thereof. Especially effective in the present invention is the use of steam of phosphoric acid sources.

The fermentation is carried out under aerobic conditions such as shaking of the culture, agitation of the culture with the introduction of air thereinto, etc. Culturing is carried out at a temperature between 24° and 37° C. The preferred culturing temperature ranges from 28° to 33° C. It is best to adjust the pH of the culture medium to between 6 and 9 during the period of culturing. Culturing is carried out from 2 to 3 days, and the L-glutamine is accumulated in the fermentation liquor. The L-glutamine accumulated in the culture liquor may then be recovered therefrom.

Recovery of the L-glutamine is carried out by filtering the culture liquor and adsorbing the L-glutamine on an ion exchange resin. The ion exchange resin is then eluted and the eluate is concentrated while it is kept at a pH of almost neutral. Then, alcohol is added thereto. The L-glutamine can finally be obtained by cooling to crystallize the L-glutamine and filtering and centrifugally separating the crystals.

The following examples are given merely as illustrative of the present invention and are not to be considered as limiting. Unless otherwise noted, the percentages therein are by weight.

Example 1

A culture medium is prepared by adding 0.001% of $K_2CrO_4$ and 0.001% of $NiCl_2 \cdot 6H_2O$ to a basal medium consisting of 15% of glucose, 4.0% of $NH_4Cl$, 0.50% of urea, 0.05% of $KH_2PO_4$, 0.05% of $MgSO_4 \cdot 7H_2O$, 0.002% of $FeSO_4 \cdot 7H_2O$, 0.002% of $MnSO_4 \cdot 4H_2O$, 0.001% of $ZnSO_4 \cdot 7H_2O$, 5γ/l. of biotin, 1 mg./l. of thiamine and 2.0% of $CaCO_3$. Three liters of this culture medium is sterilized with steam at 120° C. for 20 minutes. It is charged into a 5 liter jar fermenter, into which 300 ml. of a seed culture of *Micrococcus glutamicus* ATCC No. 14752 which has been cultured for 16 hrs. with shaking in a seed medium containing 5% of glucose, 0.5% of $(NH_4)_2SO_4$, 0.05% of $KH_2PO_4$, 0.15% of $K_2HPO_4$, 0.05% of $MgSO_4 \cdot 7H_2O$, 0.01% of $$ZnSO_4 \cdot 7H_2O$$

20 γ/l. of biotin, 1 mg./l. of thiamine, 0.5% of meat extract, 0.5% of corn steep liquor and 0.5% of urea, has been inoculated. Culturing is then carried out at 30° C. with aeration at the rate of 5 liters per minute and at 600 r.p.m.

The pH is adjusted to 6.8 for 24 hours after the beginning of culturing with 15% ammonia water and thereafter to 6.2.

The amount of L-glutamine accumulated after 72 hours of culturing is 44.3 mg./ml. The culture liquor is filtered and then concentrated at neutral pH under vacuum, after which the formed L-glutamic acid is precipitated by adjusting the pH to 3.5 with hydrochloric acid. Subsequently, the crystals of L-glutamic acid in the culture liquor are removed. The L-glutamine in the filtrate is adsorbed onto an ion exchange resin and is then eluted therefrom. The eluate is concentrated, ethyl alcohol added, and the alcoholic mixture cooled to yield 78 grams of crude crystals of L-glutamine.

Example 2

A culture medium is prepared by adding 0.002% of $K_2CrO_4$, 0.002% of $NiCl_2 \cdot 6H_2O$ and 0.001% of $$K_2Al_2(SO_4)_4 \cdot 24H_2O$$

to a basal medium consisting of 14% of glucose, 4.0% of $(NH_4)_2SO_4$, 0.50% of urea, 0.05% of $KH_2PO_4$, 0.05% of $K_2HPO_4$, 0.05% of $MgSO_4 \cdot 7H_2O$, 0.002% of $$MnSO_4 \cdot 4H_2O$$

0.002% of $FeSO_4 \cdot 7H_2O$, 0.001% of $ZnSO_4 \cdot 7H_2O$, 5γ/l. of biotin, 1 mg./l. of thiamine and 3% of $CaCO_3$. Fifteen liters of this culture medium is sterilized with steam at 120° C. for 20 minutes and charged into a small fermentation tank of 30 liter capacity, into which 1.5 liters of a seed culture of *Micrococcus glutamiscus* ATCC No. 14751 which has been cultured such as described in Example 1, has been inoculated. Culturing is then carried out at 30° C. with aeration at the rate of 10 liters per minute and with agitation at 400 r.p.m. The pH of the medium is constantly adjusted to 6.8 with fifteen percent aqueous ammonia solution during the culturing.

After 72 hours of culturing, 43.4 mg./ml. of L-glutamine is produced. By proceeding in the manner described in Example 1, 360 grams of crude crystals of L-glutamine are obtained from the culture liquor.

Example 3

A culture medium is prepared by adding 0.002% of $NiCl_2 \cdot 6H_2O$ to the basal medium of Example 1. After 72 hours of culturing, 39.1 mg./ml. of L-glutamine is accumulated in the culture liquor using the same culturing conditions as described in Example 1. From this culture liquor, 70 grams of crude crystals of L-glutamine are obtained.

Example 4

The same culture as described in Example 2 is conducted except that 0.001% of $Pb(CH_3COO)_2 \cdot H_2O$ is added to the basal medium of Example 2 to form the culture medium. After 72 hours of culturing, 38.3 mg./ml. of L-glutamine is found to be accumulated in the culture liquor. From this liquor, 325 grams of crude crystals of L-glutamine are produced.

Example 5

The procedure according to Example 1 is repeated except that *Escherichia coli* No. 128 (K12) is used as the inoculated strain instead of *Micrococcus glutamicus* ATCC No. 14752. After 72 hours of culturing, 0.42 g./dl., of L-glutamine is accumulated in the culture liquor.

The invention being thus described, it will be obvious that the same may be varied in many ways. Such variations are not be regarded as a departure from the spirit and scope of the invention, and all such modifications are intended to be included within the scope of the following claims.

What we claim is:

1. In a process for the production of L-glutamine by fermentation in an aqueous nutrient medium under aerobic conditions, the improvement which comprises conducting the fermentation in the presence of more than $10^{-7}$ mole per liter of culture medium of a metal selected from the group consisting of lead, chromium, nickel, aluminum, cobalt, mercury and mixtures thereof.

2. A process for producing L-glutamine which comprises culturing a microorganism capable of producing L-glutamic acid in an aqueous nutrient medium containing a source of carbon and nitrogen under aerobic conditions in the presence of more than $10^{-7}$ mole per liter of culture medium of a metal selected from the group consisting of lead, chromium, nickel, aluminum, cobalt, mercury and mixtures thereof.

3. The process of claim 2, wherein said lead, chromium, nickel, cobalt and mercury are employed in the form of a bivalent salt thereof and said aluminum is employed in the form of a trivalent salt thereof.

4. The process of claim 2, wherein said microorganism is *Micrococcus glutamicus*.

5. The process of claim 2, wherein said microorganism is *Escherichia coli*.

6. A process of producing L-glutamine which comprises culturing a microorganism capable of producing L-glutamic acid in an aqueous nutrient medium containing at least 10 parts of nitrogen therein per 100 parts of carbon under aerobic conditions in the presence of about $10^{-6}$ to $10^{-7}$ mole per liter of culture medium of a metal selected from the group consisting of lead, chromium, nickel, aluminum, cobalt, mercury and mixtures thereof and recovering the L-glutamine thus produced.

7. The process of claim 6, wherein said lead is employed in the form of lead acetate, said chromium in the form of potassium chomate, said nickel in the form of nickel chloride, said aluminum in the form of aluminum sulfate, said cobalt in the form of cobalt chlorides and said mercury in the form of mercury acetate.

8. The process of claim 6, wherein said microorganism is *Micrococcus glutamicus*.

9. The process of claim 6, wherein said microorganism is *Escherichia coli*.

References Cited
UNITED STATES PATENTS 3,216,906  11/1965  Kinoshita et al. _____ 195—29

LIONEL M. SHAPIRO, *Primary Examiner*.

U.S. Cl. X.R.

195—47, 114